United States Patent [19]
Tiesler

[11] Patent Number: 4,783,930
[45] Date of Patent: Nov. 15, 1988

[54] VEHICLE DOOR ASSEMBLY HAVING FLUSH SIDE GLASS

[75] Inventor: Roy F. Tiesler, Troy, Mich.

[73] Assignee: General Motors Corporation, Detroit, Mich.

[21] Appl. No.: 87,468

[22] Filed: Aug. 20, 1987

[51] Int. Cl.$^4$ .................................................. E06B 7/16
[52] U.S. Cl. ......................................... 49/374; 49/375; 49/227
[58] Field of Search ................. 49/374, 376, 213, 375, 49/227, 502

[56] References Cited

U.S. PATENT DOCUMENTS

| | | | |
|---|---|---|---|
| 2,009,637 | 7/1935 | Schutte | 49/213 |
| 2,024,772 | 12/1935 | Levan | 49/375 |
| 2,024,773 | 12/1935 | Lohrman . | |
| 2,115,698 | 5/1938 | Axe | 49/213 |
| 2,979,327 | 4/1961 | Swanson et al. . | |
| 3,964,208 | 6/1976 | Renner et al. | 49/374 X |
| 4,219,968 | 9/1980 | Sakai et al. | 49/227 X |
| 4,483,100 | 11/1984 | Blankenburg et al. | 49/352 |
| 4,561,211 | 12/1985 | Raley et al. | 49/374 |
| 4,575,967 | 3/1986 | Bickerstaff | 49/211 |
| 4,662,113 | 5/1987 | Weaver | 49/374 |

FOREIGN PATENT DOCUMENTS

| | | |
|---|---|---|
| 2435766 | 5/1976 | Fed. Rep. of Germany . |
| 2827372 | 3/1980 | Fed. Rep. of Germany . |
| 3210468 | 9/1983 | Fed. Rep. of Germany . |
| 3236168 | 5/1984 | Fed. Rep. of Germany . |

*Primary Examiner*—Joseph Falk
*Attorney, Agent, or Firm*—William E. Schuetz

[57] ABSTRACT

A window guide and seal arrangement for use with a framed vehicle door assembly includes a pair of stationary guide tracks carried by the door, a rim module secured to the window and extending along its sides and bottom and which is slidably received in the guide tracks, and a hollow seal of constant cross section carried by the rim module and engageable with the outer side of the guide tracks, the guide tracks being constructed and arranged such that it causes the window to be moved inwardly as it is being lowered to reduce friction between the seal and guide track and to be moved outwardly into tight engagement with the guide tracks and so that it is substantially flush with all sides of the exterior door assembly when it approaches its closed position.

4 Claims, 3 Drawing Sheets

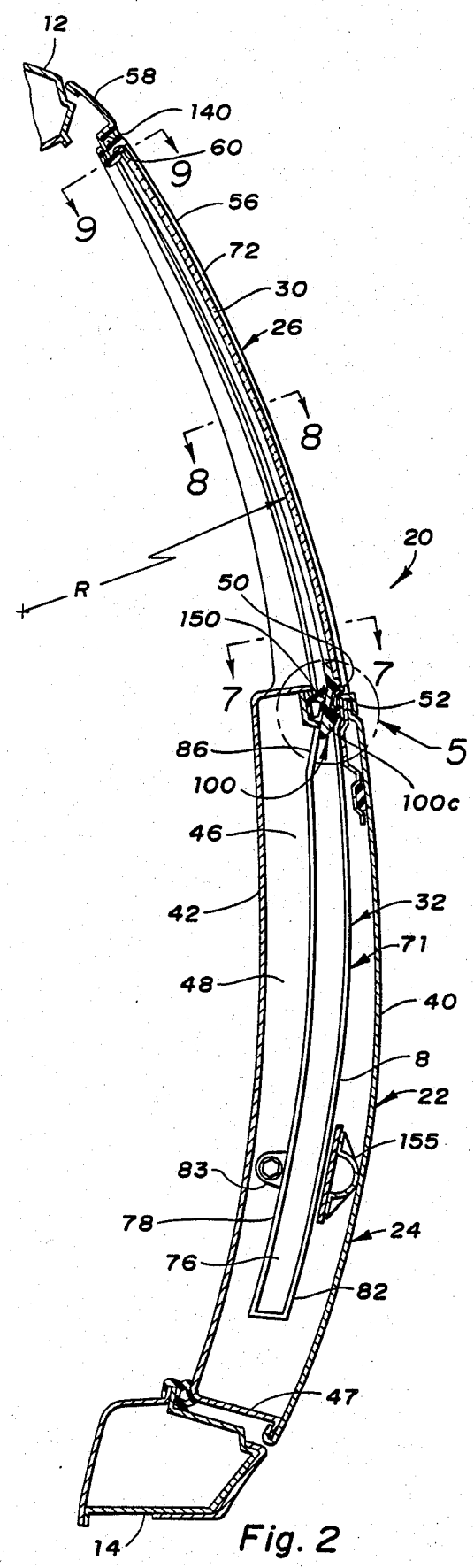
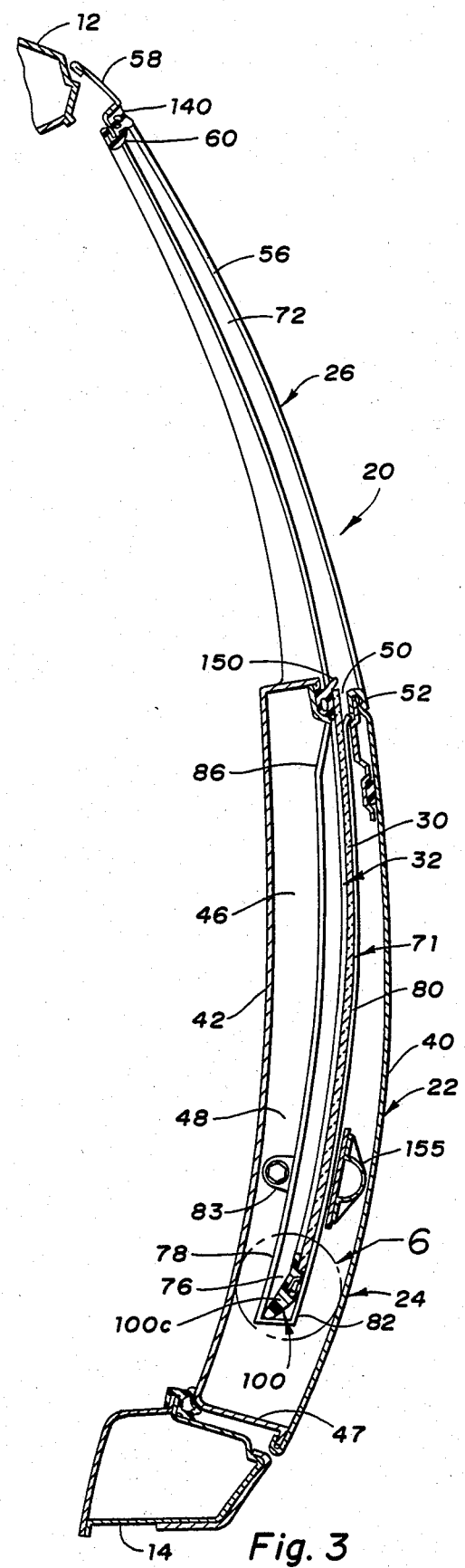
Fig. 2
Fig. 3

VEHICLE DOOR ASSEMBLY HAVING FLUSH SIDE GLASS

The present invention relates to a door assembly for an automotive vehicle and, more particularly, to a framed door assembly having a vertically movable window and a window guide and seal arrangement therefor which minimizes friction during opening and closing movements and which is operable to position the window so that it is substantially flush with the exterior door body structure when in its closed position.

Heretofore, vehicle door assemblies have been provided which included window guide arrangements for effecting movement of the window outwardly of the door at the belt line thereof so as to be substantially flush therewith when in its closed position. Examples of such arrangements are disclosed in U.S. Pat. Nos. 2,979,327 and 4,575,967 and German patent No. 24 35 766. These arrangements, however, have included fairly complicated guides and rollers to control the path of movement of the window so that the lower edge will be substantially flush with the belt line. It is also known to provide framed doors with stationary guides carrying a seal means for slidably receiving a window or side guides of a window and in a manner in which the window is substantially flush with the door frame at its sides and top when in its closed position. Examples of such arrangements are shown in U.S. Pat. No. 2,024,773 and German patent No. 32 36 168 A1.

The present invention is directed to the concept of providing a window guide arrangement for use in a framed vehicle door assembly which is an improvement over these known prior art arrangements in that it not only enables the window to be substantially flush at all sides with the exterior body structure of the door assembly when in its closed position, but is also of a simplified construction having a minimal number of parts, does not require close manufacturing tolerances and allows a seal means of constant shape to be employed.

Accordingly, a broad object of the present invention is to provide a new and improved window guide arrangement for a framed door assembly for use in an automotive vehicle which is operable to position the window when in its closed position so as to be substantially flush at all its sides with the exterior body structure of the door assembly and which is of a simplified construction, having a minimal number of parts, does not require close tolerances and allows a seal means of constant shape to be employed.

Another object of the present invention is to provide a new and improved window guide and seal arrangement for use in a framed vehicle door assembly and in which the guide arrangement includes a pair of stationary side guide tracks, preferably made of plastic, and in which the window has a rim module along its sides and bottom which is slidably received within the stationary side guide tracks and which carries a seal means engageable with the side guide tracks and wherein the side guide tracks are so constructed and arranged that it causes the window to be moved inwardly to reduce the friction between the seal means and the guide tracks as it is being lowered and causes the window to be moved outwardly towards the exterior of the belt line of the door assembly as it approaches its upper closed position to move the window seal means in tight engagement with the side tracks and so that the lower edge of the window is substantially flush with the exterior door assembly.

Yet another object of the present invention is to provide a new and improved window guide arrangement for a framed vehicle door assembly, as defined in the next preceding object, and in which the guide tracks include an upper portion whose width progressively increases proceeding from its upper edge toward the belt line of the door assembly, a lower portion laterally offset inwardly of the door from the upper portion and an intermediate portion which is skewed to connect the upper and lower portions so as to define a continuous guide track, and wherein the rim module has grooves therein coextensive with its sides and bottom for receiving a complementary shaped hollow flexible seal integrally or adhesively secured to the rim module, and wherein the upper portion of the guide tracks allow the window to be moved inwardly while the intermediate portion thereof cause the window to be moved inwardly to release the pressure engagement between the seal means and the guide track when the window is being lowered, and wherein the intermediate portion of the guide tracks effects movement of the lower part of the window outwardly toward the exterior belt line to cause the seal means to be moved in tight sealing engagement with the stationary guide tracks when in its closed position and so as to position the lower edge of the window substantially flush with the exterior of the door assembly.

The present invention further resides in various novel constructions and arrangement of parts, and further objects, novel characteristics and advantages of the present invention will be apparent to those skilled in the art to which it relates and from the following detailed description of the illustrated, preferred embodiments thereof made with reference to the accompanying drawings forming a part of this specification and in which similar reference numerals are employed to designate corresponding parts throughout the several views, and in which:

FIG. 2 is an enlarged cross sectional view of the vehicle shown in FIG. 1 and taken in the direction of the arrows 2—2 of FIG. 1;

FIG. 3 is a view like that shown in FIG. 2, but showing different parts thereof in different positions;

Figure 10:
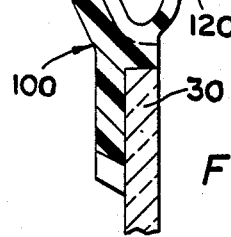
Figure 9:
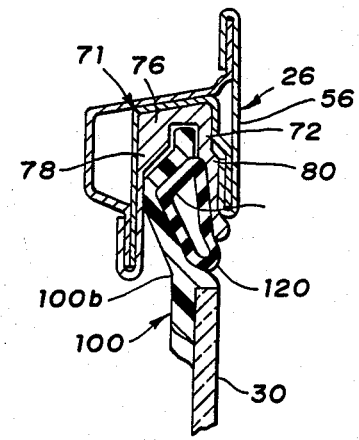

FIG. 9 enlarged fragmentary sectional view taken along the lines 9—9 of FIG. 2; and FIG. 10 is a view like that shown in FIG. 9 but showing an alternative embodiment.

Figure 1:
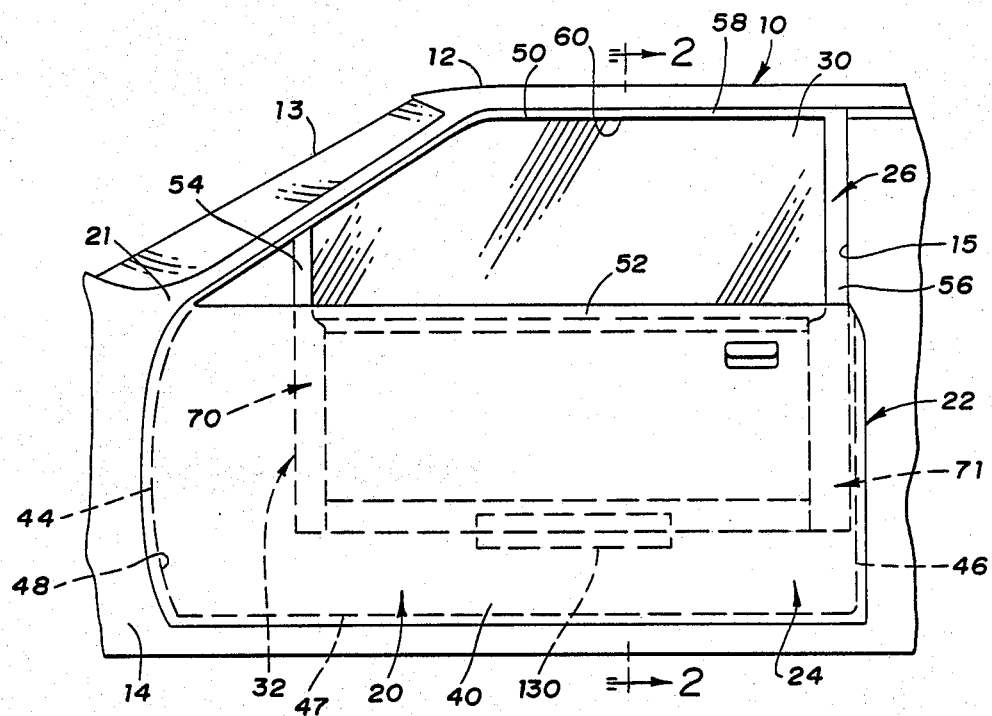
FIG. 1 is a fragmentary side elevational view of an automotive vehicle embodying the novel framed door assembly of the present invention.
Figure 4:
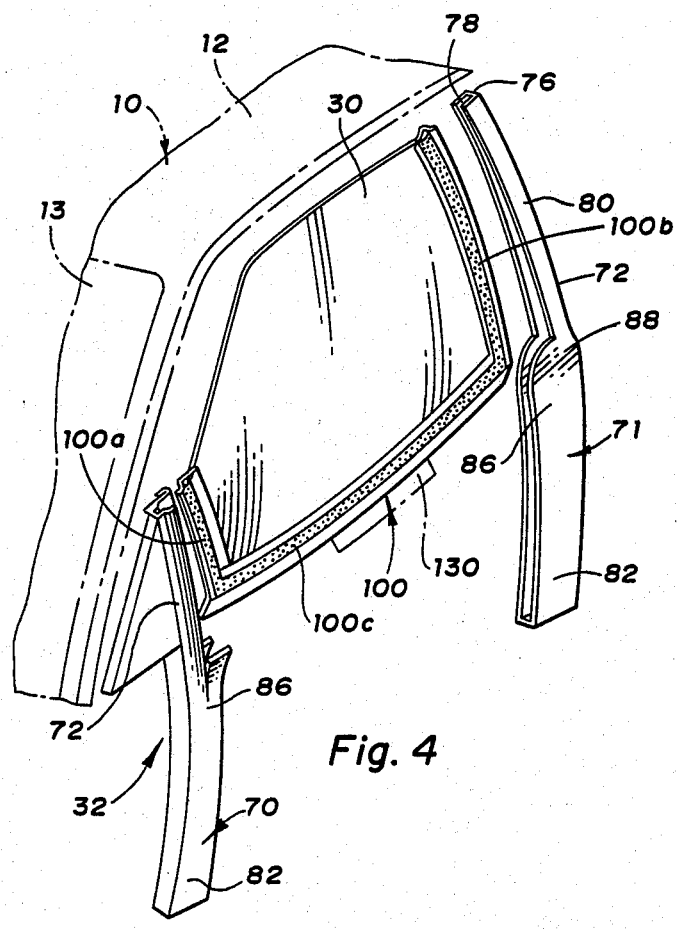
FIG. 4 is a fragmentary exploded view of part of the vehicle door assembly shown in FIG. 1.

Referring to FIG. 1 of the drawings, an automotive vehicle 10 is thereshown. The vehicle 10 includes a roof 12, front windshield 13 and side body structure 14 defining a door opening 15. The vehicle 10 further includes a novel door assembly 20 embodying the present invention which is adapted to be suitably hinged adjacent via hinges (not shown) to the front or A pillar 21 of the vehicle 10 and which can be moved between an open and a closed position in which it opens and closes off the opening 15 to permit ingress and egress to the interior of the vehicle 10.

As best shown in FIGS. 1 and 2, the novel door assembly 20 comprises, in general, a vehicle door means 22 having a lower body 24 and an upper frame 26 or frame means, a curved window 30 movable between open and closed positions and a window seal and guide arrangement 32 for guiding the path of movement of the window 30 between open and closed positions and which is operable to position the window 30, when in its closed position, so that it is substantially flush with the frame means 26 and the exterior of the door body 24. In addition, the door assembly 20 includes a suitable or conventional window regulator mechanism (not shown) operatively connected with the window 30 to effect movement of the same between its open and closed positions.

As best shown in FIGS. 2 and 3, the lower body 24 of the door means 22 comprises an outer panel 40, an inner panel 42, a pair of end panels or walls 44 and 46 and a bottom 47 which are suitably secured or welded together and which together define a well 48 having an elongated opening 50 at its top or upper end 52. The upper end 52 defines the belt line location of the door assembly 20 or vehicle 10.

The door means 22 also includes the frame means 26 which has a generally inverted U-shape, as viewed in elevation and which is U-shaped, as viewed in cross section. The frame means 26 includes upwardly extending front and rear sides or side portions 54 and 56 and a top or top portion 58. The frame means 26 and the door ends, bottom and inner and outer panels 44, 46, 47, 40 and 42, respectively, are preferably made from sheet metal. The sides 54, 56 and top 58 of the frame means 26 define a window opening 60 above the belt line 52 of the door assembly 20.

The window 30 is made from a suitable transparent material, such as glass, and is curved, as viewed in cross section in FIG. 2. Its radius of curvature is designated by the reference numeral R.

The window guide and seal arrangement 32 slidably guides the window 30 for movement between a closed position, as shown in FIGS. 1 and 2, in which it closes off the opening 60, and an open position, as shown in FIG. 3, in which it is wholly disposed within the well 48 of the door lower body 24. To this end, the window guide and seal arrangement 32 comprises a pair of stationary guide tracks 70 and 71 at the fore or front and rear or aft ends of the window 30, respectively. The guide tracks 70 and 71, except for their length, are of an identical construction and therefore, only the guide track 71 for slidably receiving the rearmost portion of the window 30 will be described in detail, and the same reference numerals will be used to designate corresponding parts.

Figure 7:
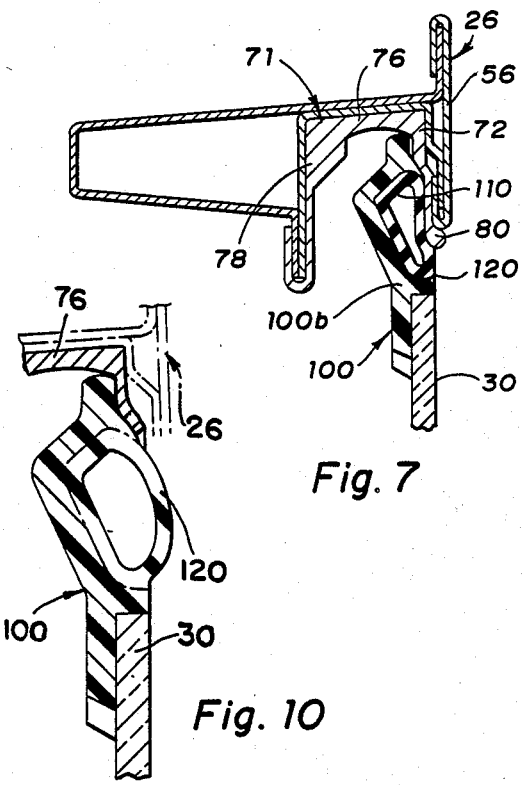
FIG. 7 is an enlarged fragmentary sectional view taken along the lines 7—7 of FIG. 2.
Figure 8:
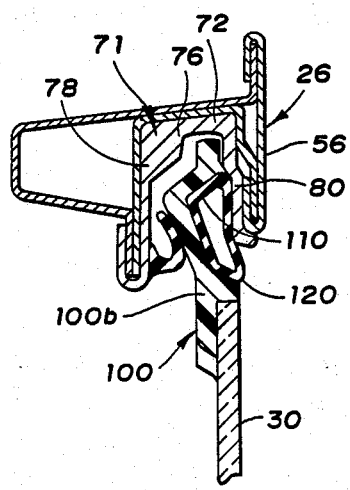
FIG. 8 is an enlarged fragmentary sectional view taken along the lines 8—8 of FIG. 2.

The guide track 71 is of a one piece plastic construction and is, as best shown in FIGS. 7-9, generally U-shaped in cross section. The guide track 71 has an upper portion 72 which is secured within the U-shaped side frame portion 56 of the frame means 26. The U-shaped guide track 71 throughout its length has a bottom 76, an inner side wall 78 and an outer side wall 80 which defines an elongated recess or opening facing toward the adjacent rear side edge of the window 30. The upper portion 72 to the guide track is secured within the frame means 26 in any suitable fashion. The guide track portion 72 has a width between its outer and inner side walls 78 and 80 which progressively increases proceeding from the top edge of the guide track adjacent the roof 12 of the vehicle 10 toward the belt line 52, and for a reason to be hereinafter more fully described.

The guide track 71 also includes a lower portion 82 which is U-shaped, as viewed in cross section, and which is wholly disposed within the well 48 of the door means 22. The lower portion 82 of the guide track 71 is suitably bolted or otherwise secured to the end wall 46 of the door means 22 via a bracket 83. The other front guide track 70 is suitably bolted or secured to the inner panel 42 of the door means 22 via a bracket (not shown). Both the upper portion 72 and the lower portion 82 of the guide track 70 have a radius of curvature which is equal or substantially equal to the radius of curvature R of the window 30. The radius of curvature of the lower track portion 82, however, is laterally offset from the radius of curvature of the upper portion 72 and in a direction inwardly from the outer panel 40 of the door means 22. In addition, the bottom 76 of the lower portion 82 is wider than the bottom 76 of the upper portion 72. The guide track 71 further includes an intermediate portion 86 which connects or bridges the upper and lower portions 72 and 82 so as to form one continuous track for the window 30.

The intermediate portion 86 of the guide track 72 has its inner side wall 78 skewed or angled upwardly toward the outer door panel 40 or door top opening 50 and its outer side wall 80 which is turned or flanged outwardly toward the outer panel 40, as indicated by reference numeral 88. The flange terminates adjacent the belt line 52 of the door means 22.

The guide and seal arrangement 32 further includes a rim module 100 secured to and coextensive therewith the side and bottom edges of the window 30. The rim module 100 comprises a one piece plastic member bonded to the glass 30 adjacent its side and bottom edges and has portions 100a, 100b and 100c which extend laterally outwardly therefrom, respectively. As best shown in FIGS. 5-9, the rim module 100 includes an inner flange portion 102 bonded to the backside of the window or glass 30 and a second flange portion 104 bonded to the actual side and bottom edges of the glass. The rim module portions 100a and 100b along the forward and rearward side edges of the window 30 are slidably received within the upper portions 82 of the guide tracks 70, 71 and are shaped complementary with the upper portions of the guide tracks 70, 71. The rim module portions 100a, 100b and 100c adjacent the side and bottom edges of the window 30 are generally V-shaped to define a V-shaped groove 110. Carried within the V-shaped groove 110 is a flexible seal means 120. The seal means 120 comprises a hollow elastomeric member of constant cross sectional shape and is suitably bonded or adhesively secured to the rim module 100 within the groove 110. Alternatively, as shown in FIG. 10, the rim module could be molded of a suitable elastomeric material and the elastomeric seal means 120 could be of a different durometer and dual molded therewith so that the two would be integral with each other.

The bottom portion 100c of the rim module 100 adjacent the bottom edge of the window 30 extends downwardly and inwardly of the plane of the window 30. This portion 100c of the rim module 100 is at all times received in either the intermediate portions 86 or the lower portions 82 of the guide tracks 70, 71. Its shape is such that it has a planar upper side which is shaped complementary with the inner wall 78 of the skewed intermediate portion 86 of the guide track 70, 71 and an overall width which is slightly less than the width of the lower portion 82 of the guide tracks 70, 71. The lower portion 100c of the rim module 100 is preferably secured to a sash plate 130 which in turn is operatively connected with a suitable or conventional window regulator mechanism (not shown) for moving the window 30 and the rim module 100 between its open and closed positions.

Figure 5:
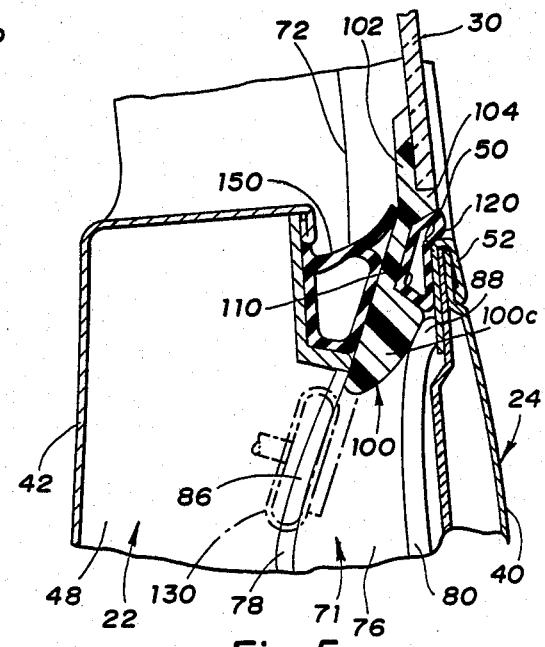
FIG. 5 is an enlarged, fragmentary sectional view of the part of the door assembly shown in FIG. 2 and labeled by the phantom line circle 5 in FIG. 2.
Figure 6:
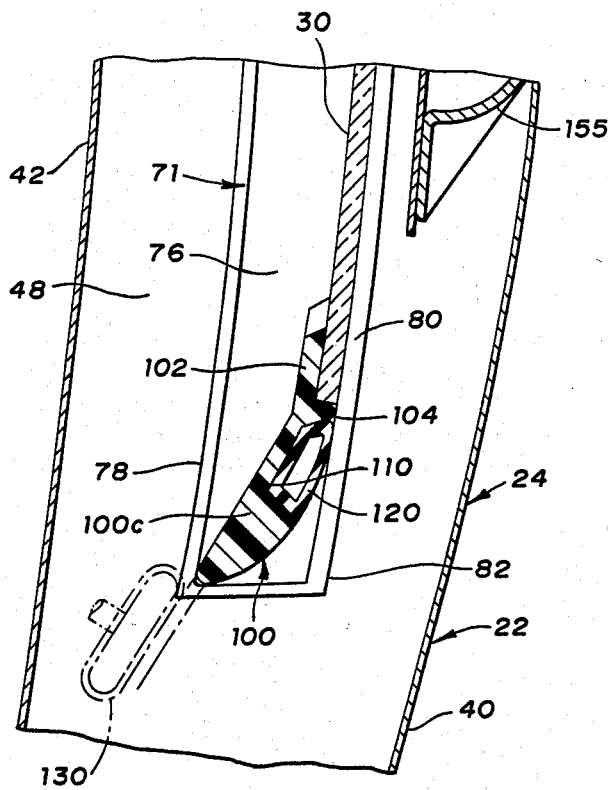
FIG. 6 is an enlarged fragmentary sectional view of part of the vehicle door assembly shown in FIG. 3 and labeled by the phantom circle 6 in FIG. 3.

Operation of the window guide and seal arrangement 32 will be described with reference to FIGS. 2–9 of the drawings. When the window 30 is in its fully closed position, as shown in FIG. 2, the upper edge of the window engages a suitable seal 140 carried within the upper frame portion 58 of the frame means 26 of the door assembly and the side portions 100a, 100b of the rim module 100 are received within the upper portions 72 of the guide tracks 70 71. Also, in this position, the lower portion 100c of the rim module 100 is disposed within the intermediate portion 86 of the guide tracks 70, 71 and in engagement with the skewed inner side wall 78 of the intermediate portions 86 of the guide tracks 70, 71. In this position the window 30 is substantially flush with the upper portion 58 and the side portions 54, 56 of the frame means 26 and is substantially flush with the exterior side of the outer wall or panel 40 of the door means 22, as best shown in FIG. 5. Also in this position, the seal means 120 extending along the sides of the rim module 100 in tight engagement with the outer wall 80 of the upper portions 72 of the guide tracks 70, 71, the seal means 120 being hollow and deformable to allow for this tight engagement. At the same time the portion of the seal means 120 carried by the lower portion 100c of the rim module 100 is disposed above the flanges at the opening 92 and engages the outer door structure at the belt line 52 so as to provide the seal across the belt line.

When it is desired to open the window 30 in the vehicle 10, the window regulator mechanism (not shown) will be operated to cause the window 30 to be lowered. As the window 30 is caused to be lowered, the configuration of the intermediate portion 86 of the guide tracks 70, 71 causes the lower portion 100c of the rim module 100 to be moved inwardly from the outer panel 40 of the door means 22 and downwardly from the belt line 52 of the door assembly 20. At the same time, the tapered upper portion 72 of the guide tracks 70, 71 allows the window 30 to be moved inwardly and pivot about its top edge. As this occurs, the tight pressure engagement between the seal means 120 and the outer side 80 of the guide tracks 70, 71 is relieved so as to minimize friction during the downward movement. When the lower portion 100c of the rim module 100 is at a location adjacent the lower guide track portions 82, the window 30 will be lowered along its radius of curvature R until it reaches its fully down position, as shown in FIG. 3.

When it is desired to raise the window 30 to its closed position, the reverse movement will take place. The window 30 will be moved upwardly along its radius of curvature R without any tight pressure engagement between the seal means 120 and the outer wall 80 of the guide tracks 70, 71 until the lower portion 100c of the rim module 100 is located adjacent the intermediate portion 86 of the guide tracks 70, 71. When this occurs, the inner wall 78 of the intermediate portion 86 of the guide tracks 70, 71 will cause the rim module 100 to pivot about its upper edge and be moved outwardly toward the outer panel 40 of the door means 22. Since the upper guide track portions 72 are tapered, this outward movement is permitted. This movement occurs until the window 30 reaches its fully closed position, as shown in FIG. 2.

As the window 30 approaches its uppermost position, the seal means 120 will also be caused to be moved into engagement with the outer side wall 80 of the guide tracks 70, 71 and the seal means 120 along the lower portion 100c of the rim module 100 will be moved outwardly to engage the upper portion of the door means 22 at the belt line 52 immediately above the flanges 88. This moves the window 30 into tight outward engagement with the guide tracks 70, 71 and belt line 52 of the vehicle to provide a good seal and at the same time positions the window 30 such that its upper and side edges are substantially flush with the frame means 26 and the window is substantially flush with the exterior side of the outer panel 40 of the door means 22.

As can be best seen from FIG. 5, when the window 30 is moved to its fully closed position, it also engages a suitable seal means 150 carried by the inner door panel 42 adjacent its upper end at the opening 50. This seal means 150 functions to at all times either engage the lower portion 100c of the rim module 100 when the window 30 is in its closed position or to engage the window as it is being lowered towards its fully open position to provide a seal therebetween. The seal means 150 carried by the upper side of the frame means 26 could be of any suitable or conventional construction. It should also be apparent that the vehicle side body structure would carry a suitable seal means (not shown) against which the door side frame 26 abuts to provide a seal between the body structure 14 and the door means 22.

The door assembly 20 also includes a side impact beam 155 located between the outer panel and the lower portions 82 of the guide tacks 70, 71.

From the foregoing, it should be apparent that a novel door assembly 20 has been provided in which the door assembly 20 has a window guide and seal arrangement 32 which is of a simplified construction, has a minimal number of parts, does not require close tolerances and is aesthetically smooth and aerodynamic in appearance.

Although the illustrated embodiments hereof have been described in great detail, it should be apparent that certain modifications, changes and adaptations may be made in the illustrated embodiments, and that it is intended to cover all such modifications, changes and adaptations which come within the spirit of the present invention.

The embodiments of the invention in which an exclusive property or privilege is claimed are defined as follows:

1. A door assembly for an automotive vehicle comprising
    a door means having a lower body and an upper frame, said lower body including inner and outer spaced panels and fore and aft ends which together define a door well having an elongated opening at its upper end,
    said frame being generally U-shaped and having upwardly extending fore and aft sides and a top which together with the upper end of the lower body defines a window opening, a window supported by said door means for generally vertical movement between open and closed positions and a window guide arrangement including a pair of guide tracks carried by the door means adjacent its fore and aft ends and guide means carried by the window and slidably received within said guide tracks and with the guide arrangement being operable to effect movement of the window through a path such that the window at its lower end is substantially flush with the outer panel of the lower door body and substantially flush with the top and sides of said frame when in its closed position, the improvement being that said guide tracks are generally U-shaped in cross-section and comprise an upper portion whose width progressively increases proceeding from its upper end toward its lower end located adjacent said upper end of said lower body, a lower portion disposed within said lower body and laterally offset from said upper portion and an intermediate skewed portion disposed within said lower body adjacent its upper end and connecting said upper and lower portions to define a continuous track, and wherein said guide means comprises a rim module secured to said window and extending along and outwardly from the fore and aft side edges and bottom edge of said window, said rim module along the fore and aft side edges of the window being slidably received within said upper portions of said tracks and along the lower edge of the window being slidably received within said intermediate and lower portions of said tracks, and a flexible seal means carried by said rim module at a location outwardly of the fore and aft side edges of the window and being coextensive with said rim module along said fore and aft side edges of the window, said seal means facing outwardly of the window and engaging said guide tracks to provide a seal, said upper guide track portions due to their progressively increasing width proceeding from their upper ends toward their lower ends allowing said rim module and said window to be moved inwardly of said door means as the skewed intermediate portion of said track causes said rim module to move inwardly of the door and into said lower portion of said guide tracks when the window is being lowered from its fully closed position to release the seal means from tight pressure engagement with the guide tracks and said upper and intermediate portions of said guide tracks respectively allowing the causing movement of said window outwardly of said door means as the window approaches its fully closed position to cause said seal means to tightly engage said guide tracks and to position said window so that it is substantially flush with said frame means and with the outer exterior panel of said lower body of said door means when in its fully closed position.

2. A door assembly, as defined in claim 1, and wherein said seal means in dual molded with said rim module so as to be integral therewith.

3. A door assembly for an automotive vehicle comprising a door means having a lower body defining a belt line at its upper end and an upper frame disposed above the belt line, said lower body including inner and outer panels and fore and aft ends which together define a door well having an elongated opening at said belt line, said frame being generally U-shaped and having upwardly extending fore and aft sides and a top which together with the belt line of the lower body defines a window opening, a window supported by said door means for generally vertical movement between open and closed positions and a window guide and seal arrangement including a guide track carried by the door means at each of its fore and aft ends and guide means carried by the window and slidably received within said guide tracks and with the guide arrangement being operable to effect movement of the window through a path such that the window is caused to move outwardly of said door means so that its lower end is substantially flush with the outer panel of the lower door body and substantially flush with the top and sides of said frame when in its closed position, the improvement being that said guide tracks are generally U-shaped in cross-section and comprise an upper portion whose width progressively increases proceeding from its upper end toward its lower end adjacent said belt line, a lower portion disposed within said lower body and offset laterally and inwardly from said upper portion and an intermediate portion disposed within said lower body adjacent said belt line and connecting said upper and lower portions to define a continuous track, said intermediate portion having an outer side wall which is flanged and extends toward the outer side of the door lower body adjacent the belt line and an inner side wall which is skewed upwardly toward the outer panel of said lower door body, and wherein said guide means comprises a rim module secured to said window and extending along and outwardly from the fore and aft side edges and bottom edge of said window, said rim module along the fore and aft side edges of the window being slidably received within said upper portions of said tracks and along the bottom edge of the window being slidably received within said intermediate and lower portions of said tracks, and a flexible seal means carried by said rim module and being coextensive therewith along said fore and aft side and bottom edges of the window, said rim module defining a V-shaped groove located intermediate the adjacent side and bottom edges of said window and its outermost edges and facing outwardly of said door means and toward the outer side of said guide tracks and said seal means comprising a hollow flexible member whose inner portion is shaped complementary with said groove and secured to said rim module and whose outer portion engages the outer side of said tracks to provide a seal, said upper guide track portions due to their progressively increasing width proceeding from their upper ends toward said belt line allowing said rim module and said window to be moved inwardly of said door means as the intermediate portion of said track causes movement of said rim module inwardly of the door and into said lower portion of said guide tracks when the window is being lowered from its fully closed position to release the seal means from tight pressure engagement with the guide tracks and reduce friction, and said upper and intermediate portions of said guide tracks respectively allowing and causing movement of said window outwardly of said door means as the window approaches its fully closed position to cause said seal means to deflect and tightly engage said guide tracks and to position said window so that it is substantially flush with said frame means along its top and sides and so that the seal means adjacent the bottom edge of the window is located above said curved flanges on the inner wall or said intermediate portion and engages the outer panel at the belt line so as to be substantially flush with the outer panel of said lower body of said door means when in its fully closed position.

4. A door assembly, as defined in claim 3, and wherein said seal means is adhesively secured to said rim module.